Nov. 26, 1968    M. D. GILL    3,413,549
ELECTRICAL INTEGRATING METERS HAVING DUST-PROOF ENCLOSURES
Filed Nov. 6, 1963
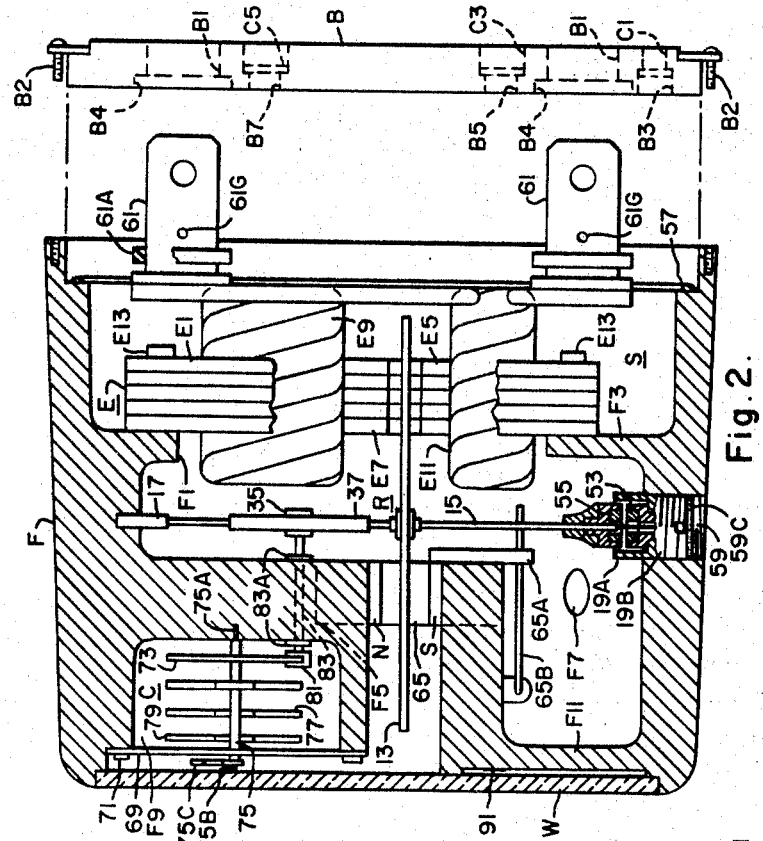
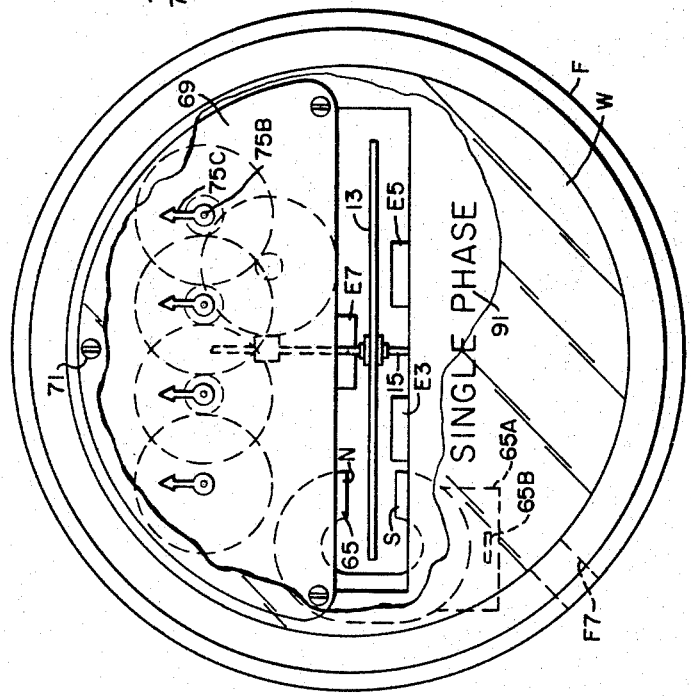
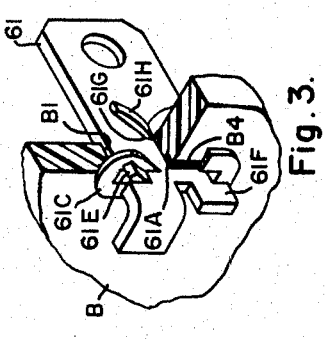
INVENTOR
Merrion D. Gill
BY *J. L. Freedman*
ATTORNEY United States Patent Office 3,413,549
Patented Nov. 26, 1968

3,413,549
ELECTRICAL INTEGRATING METERS HAVING DUST-PROOF ENCLOSURES
Merrion D. Gill, Raleigh, N.C., assignor to Westinghouse Electric Corporation, East Pittsburgh, Pa., a corporation of Pennsylvania
Filed Nov. 6, 1963, Ser. No. 321,835
5 Claims. (Cl. 324—137)

ABSTRACT OF THE DISCLOSURE

A meter is located within a dust-proof casing which also serves as a meter frame.

My invention relates to electrical integrating meters and in particular to an improved mechanical construction and arrangement of components for such meters.

Electrical integrating meters are employed extensively for measuring a function of alternating energy supplied from a source to a load. For example such meters are widely employed for measuring watthours. To a lesser extent electrical integrating meters are employed for measuring other functions such as varhours. Today a conventional electrical integrating meter comprises a mechanism in the form of a disc-type induction motor and a register or clockwork mounted on a very substantial and sturdy supporting frame which frequently is of diecast metal. This mechanism is located in an enclosure formed by a base plate on which the mechanism is mounted and a cup-like glass cover which protects the mechanism from the weather and unauthorized tampering.

A principal feature of my invention is the construction of a meter frame to form a substantial part of the enclosure which protects components of the mechanism. The resultant meter structure has terminal dimensions similar to those of meters currently in use so that my novel meters are interchangeable with those in present use.

A further feature of my present invention is that I seal the resultant enclosure against the entry of deleterious material such as dust.

It is therefore an object of the invention to provide an improved integrating electrical meter.

It is a further object of the invention to provide an integrating electrical meter wherein the meter frame forms a substantial part of the meter enclosure.

It is an additional object of the invention to provide an electrical integrating meter wherein the meter frame forms a substantial part of the meter enclosure and wherein the enclosure is sealed against entry of deleterious material.

The foregoing and other features of my invention will become apparent upon reading the following detailed description taken in conjunction with the drawings wherein:

FIGURE 1 is a view in front elevation with parts broken away of an electrical integrating meter embodying the invention;

FIG. 2 is a view essentially in sectional side elevation of the meter shown in FIGURE 1; and FIG. 3 is a detailed view in perspective showing in greater detail the mounting of a contact blade in the base of the meter of FIGS. 1 and 2.

Referring in detail to the drawings and particularly to FIG. 2 an alternating-current induction-type watthour meter assembly is disclosed which includes a stator S and a rotor R. The rotor R constitutes the prime moving element of the mechanism of the meter assembly and includes a shaft 15 mounted for rotation about a vertical axis by an upper bearing assembly 17 and a lower bearing assembly 19A. An electroconductive disc 13 is secured to the shaft 15 for rotation therewith. The shaft 15 is constructed of a suitable material such as aluminum and has teeth cut therein to form a worm 35 which cooperates with a worm wheel 37 for the purpose of driving a register or clockwork C mounted in the stator S.

The rotor R also has a permanent magnet 55 which is located above a permanent magnet 53 forming part of the lower bearing assembly 19A. These permanent magnets act in repulsion to support the weight of a rotor R. The rotor R may be similar to the rotor shown in the patent application of David F. Wright, Ser. No. 11,335, filed Feb. 26, 1960 and assigned to the same assignee, which issued Aug. 4, 1964, as Patent No. 3,143,704. The reference characters identifying components of the rotor R are similar to the reference characters identifying the same components in the aforesaid Wright application. The upper bearing assembly 17 is similar to the upper bearing assembly bearing the same reference character in the Wright application. The lower bearing assembly 19A is similar to the bearing assembly 19 of the aforesaid Wright application except for the addition of threads 19B and a screw driver slot on the exterior surface of the bearing assembly 19A.

The stator S includes an enclosure formed by a frame F, a light-permeable window W and a base B. The frame F has a generally cylindrical or cup-shaped structure with open ends and with a horizontal axis. The frame F may be constructed of a non-magnetic material having good rigidity such as a conventional aluminum-base die-casting material. If the material employed for the frame F is light-permeable, the window W and the frame F can be constructed as a unitary member. However, for ease in assembly and to permit utilization of the best materials at the present time it is preferred that a separate window W be employed which may be constructed of glass. The window W may be secured in any suitable manner to the frame F as by an adhesive which forms an air-tight bond between the window and the frame.

The base B may be constructed of a rigid material such as a phenolic resin. It is snugly received within a recess formed in the end of the frame F and may be secured thereto in any desirable manner as by current or machine screws. The gasket 57 may be introduced between the frame F and the base B for the purpose of establishing an air-tight seal therebetween. For present purposes it will be assumed that the base B is secured to the frame F by machine screws B2.

The upper bearing 17 is secured directly to the frame F in any suitable manner. For example the bearing assembly 17 may be a press fit in a hole provided in the frame F. The lower end of the frame F is provided with a threaded opening 59 for threaded reception of the lower bearing assembly 19A. The lower bearing assembly may be rotated into proper vertical adjustment for supporting the rotor R and a suitable cement 59C thereafter may be applied over the exposed end of the bearing assembly 19A for the purpose of providing an air-tight seal for the opening 59.

The frame E is provided with vertically projecting ears F1 and F3 for supporting a conventional electromagnet E. This electromagnet may include a magnetic structure, formed of soft magnetic laminations E1, which has two current poles E3 and E5 and a voltage pole E7. The pole faces of these poles are spaced to provide an air gap in which a portion of the disc 13 is located. A voltage coil E9 surrounds the voltage pole and current windings E11 surround the current poles E3 and E5. The voltage coil is provided with a large number of turns of small-diameter copper conductor and is arranged to be energized in accordance with the voltage of an alternating-current circuit. The current windings are constructed of a relatively small number of turns of large diameter copper conductor and are arranged for energization in accordance with current flowing in the associated alternating-current circuit. When so energized the electromagnet produces a shifting magnetic field in its air gap for the purpose of applying a torque to the disc 13 which is dependent on the magnitude of power flowing in the associated alternating-current circuit. The electromagnet E1 is secured to the ears F1 and F3 in any suitable manner as by machine screws E13.

In order to energize the electromagnet E the ends of the voltage coil E9 and of the current windings E11 are connected to suitable terminals such as conventional electroconductive contact blades 61. Preferably each of these contact blades is sealed in any suitable manner to the base B to provide an air tight connection therebetween. In a preferred embodiment of the invention each of the contact blades 61 passes through a slot B1 in the base B which is proportioned to receive snugly the contact blade. The base B is provided with a trough B3 completely surrounding the left end of the contact blade as viewed in FIG. 3. The trough is filled with a gasket 61A which is constructed of a resilient material such as rubber. In its relaxed condition the gasket extends slightly out of the trough B3. A washer 61C has a slot for snugly receiving the contact blade 61. The washer may be constructed of a suitable material such as stainless steel. It will be noted that fingers 61E and 61F are formed by slitting the contact blade and are bent to overlie portions of the washer 61C. These fingers limit motion of the washer in a direction towards the left as viewed in FIG. 3 relative to the contact blade.

The gasket 61A is compressed between the washer 61C and the base B in any suitable manner. In the embodiment of FIG. 3 the contact blade is provided with a hole 61G for reception of a cotter pin 61H. When the contact blade 61 is forced to the right as viewed in FIG. 3 to compress the gasket 61A the hole 61G extends just far enough beyond the base B to receive the cotter pin 61H. Consequently after insertion of the cotter pin and release of the contact blade 61 the gasket 61A remains under compression to effect a substantial seal between the contact blade and the base. A seal of this type is disclosed in my copending patent application, Ser. No. 211,279, filed July 20, 1962.

The frame F is provided with a pocket F5 for receiving a damping magnet 65. This damping magnet may be of any suitable construction. For present purposes the permanent magnet will be assumed to be a C-shaped permanent magnet having pole faces identified by the polarity markings N for north pole and S for south pole. These pole faces are spaced to define an air gap within which a portion of the disc 13 is located. As well understood in the art the damping magnet 65 provides a restraining force or torque for the disc 13 which varies in accordance with the rate of rotation of the disc. The disc therefore rotates at a rate dependent upon the magnitude of the power in the alternating current circuit from which the meter is energized. The damping magnet may be secured to the frame F in any suitable manner as by cement.

It is conventional practice to provide a watt-hour meter with a number of adjustments such as a full-load adjustment and a light-load adjustment. If such an adjustment is desired for the meter herein described the frame F may be provided with an opening F7 through which the adjustment may be effected. After the adjustment has been completed the hole may be sealed by means of a suitable plastic cement.

The adjustment of the damping magnet may be effected by providing a soft magnetic plate 65A which engages the south pole of the permanent magnet. This plate has an opening through which projects the free end of a pivoted lever 65B. A tool may be inserted through the opening F7 to engage the lever 65B for the purpose of moving the plate 65A in a vertical direction to adjust the torque applied by the damping magnet to the disc 13.

The frame F also is provided with a pocket F9 for receiving a register. The pocket is covered by a plate 69 which is secured to the frame in any suitable manner as by machine screws 71. The register is provided with a units gear wheel 73 which is mounted on a shaft 75 for rotation therewith. The shaft 75 has a bearing pin 75A projecting from its right-hand end as viewed in FIG. 2 for rotatable reception in a bearing hole provided directly in a vertical wall of the frame F which forms the rear wall of the pocket F9. In a similar way the shaft 75 has a bearing pin 75B projecting through a bearing hole provided in the plate 69. The free end of the bearing pin 75B carries a conventional pointer 75C. In a similar manner a tens gear wheel 77 is mounted for rotation by the frame F and the plate 69 and is coupled in a conventional manner to the shaft 75 to be driven by the shaft 75 at 1/10 the rate of rotation of the shaft 75. Additional decades of the register may be mounted in a similar manner. The units wheel 73 is coupled to a driving pinion 81 which is mounted on one end of a jack shaft 83. The right-hand end of the jack shaft 83 as viewed in FIG. 2 carries the worm wheel 37 which engages the worm 35 of the shaft 15. The jack shaft 83 extends through a bearing hole provided in the vertical wall F8 of the frame F. Collars 83A are pressed on the shaft 83 to limit axial movement of the shaft 83 relative to the wall F8.

Information 91 concerning the meter is impressed or printed directly on a vertical surface of a wall F11 of the frame F which is directly behind the window W.

Although the base B may provide with the frame F and the window W a completely sealed enclosure for the remaining components of the watthour meter preferably filters are provided in the base B to permit breathing of the enclosure while preventing passage therethrough of deleterious materials such as dust. To this end the base B is provided with one or more openings across which filters extend in the manner discussed in my aforesaid patent application and in the copending patent application of Thomas J. Daley et al., Ser. No. 301,499, filed Aug. 12, 1963 and assigned to the same assignee. In FIG. 2 three openings B3, B5 and B7 are provided in the base B. These openings respectively have ceramic filters C1, C3 and C5 extending thereacross. These filters have openings sufficient to permit passage of air therethrough but the openings are small enough to bar the passage of deleterious materials such as dust therethrough. It will be noted that the lowermost filter C1 is positioned at the lowest point of the enclosure in order to permit discharge of moisture therethrough from the enclosure to the exterior. Further details concerning the construction of the filters may be obtained by reference to the aforesaid Daley et al. patent application and to my aforesaid patent application.

In summary the frame F constitutes a major component of an enclosure for components of the meter which require protection. In addition the same completely supports the rotor R for rotation and the electromagnet E. Also the frame receives directly the damping magnet and directly provides bearings for components of a register. As previously pointed out the frame additionally serves to receive directly information which is printed on a surface of the frame that is protected.

Although the invention has been described with reference to certain specific embodiments thereof the modifications falling within the spirit and scope of the invention are possible.

I claim as my invention:

1. An electrical watthour meter comprising a register, a speed-reducing gear-train moving said register, motor means for actuating said gear-train, and an enclosing case for said register, gear-train and motor means comprising a generally tubular element surrounding said motor means and having an axial dimension at least as long as the corresponding dimensions of the motor means, said element having an hermetically-integral first wall-portion embodying bearings for the movable elements of said motor means and said gear-train and having a window therein, a second wall-portion for said enclosing case separable from said first wall-portion, and a separable hermetically-integral seal of the joint between said wall-portions, said second wall portion and said window being disposed substantially respectively in spaced first and second planes extending substantially transverse to said axial dimension, said generally tubular element defining with the window and the second wall portion a substantially complete enclosure for the clockwork and the motor means.

2. The arrangement described in claim 1 wherein terminals adapted for connection to an electric power system are provided which are hermetically-integral with the second wall-portion of said enclosing case.

3. The arrangement specified in claim 1 wherein the first-mentioned wall-portion is predominantly of cast non-magnetic metal.

4. The arrangement described in claim 3 wherein terminals adapted for connection to an electric power system are hermetically-integral with said enclosing case, and an air-filter substantially impervious to atmospheric dust is supported on the second wall-portion of said enclosing case.

5. In an integrating meter, an enclosure comprising an integral tubular element having a first end closed by a light-permeable window and having an open second end, and a base member substantially closing said second end, an electromagnet disposed within the enclosure and secured to said element independently of the base member, said electromagnet having an air gap and electroresponsive means effective when energized from an alternating source for developing a shifting magnetic field in said airgap, a rotor having an electroconductive armature concentric about an axis transverse to the axis of the element, said armature having a portion spaced from the rotor axis disposed in said airgap, and a pair of bearing means spaced along said rotor axis and secured to said element for mounting the rotor for rotation relative to the element interiorly of said enclosure, permanent-magnet damping means having a second airgap within which said permanent magnet produces a magnetic field, said permanent magnet being secured to said element with a portion of said armature positioned in the second airgap to develop a torque restraining rotation of the rotor relative to the element, and translating means responsive to rotation of said rotor relative to the element, said translating means comprising a gear assembly having a bearing formed directly in said element, and printed information located directly on said element for exposure through said window, said electromagnet, rotor, damping means and translating means being located between the ends of said element.

References Cited

UNITED STATES PATENTS

| | | | |
|---|---|---|---|
| 1,177,444 | 3/1916 | Pratt | 324—137 |
| 2,476,909 | 7/1949 | Ratz | 324—156 |
| 2,668,275 | 2/1954 | Goss | 324—152 |
| 2,790,951 | 4/1957 | Holtz | 324—156 |

FOREIGN PATENTS 301,915 10/1929 Great Britain.

RUDOLPH V. ROLINEC, *Primary Examiner.*

P. A. URIBE, *Assistant Examiner.*